(12) United States Patent
Haft

(10) Patent No.: US 11,377,994 B2
(45) Date of Patent: Jul. 5, 2022

(54) METHOD FOR EXHAUST GAS AFTERTREATMENT, AND EXHAUST GAS AFTERTREATMENT SYSTEM

(71) Applicant: Vitesco Technologies GmbH, Hannover (DE)

(72) Inventor: Gerhard Haft, Maxhütte-Haidhof (DE)

(73) Assignee: Vitesco Technologies GmbH, Regensburg (DE)

(*) Notice: Subject to any disclaimer, the term of this patent is extended or adjusted under 35 U.S.C. 154(b) by 0 days.

(21) Appl. No.: 17/235,749

(22) Filed: Apr. 20, 2021

(65) Prior Publication Data

US 2021/0239025 A1 Aug. 5, 2021

Related U.S. Application Data

(63) Continuation of application No. PCT/EP2019/078630, filed on Oct. 22, 2019.

(30) Foreign Application Priority Data

Oct. 23, 2018 (DE) .................... 10 2018 218 138.1

(51) Int. Cl.
*F01N 3/22* (2006.01)
*F01N 13/00* (2010.01)
(Continued)

(52) U.S. Cl.
CPC ............ *F01N 3/225* (2013.01); *F01N 3/101* (2013.01); *F01N 3/32* (2013.01); *F01N 13/0093* (2014.06);
(Continued)

(58) Field of Classification Search
CPC combination set(s) only.
See application file for complete search history.

(56) References Cited

U.S. PATENT DOCUMENTS 5,271,223 A * 12/1993 Hoshi .................... F01N 3/222
60/276
5,461,857 A * 10/1995 Itou .......................... F01N 3/22
60/276
(Continued)

FOREIGN PATENT DOCUMENTS

CN 107060959 A 8/2017
CN 107542561 A 1/2018
(Continued)

OTHER PUBLICATIONS

International Search Report and Written Opinion dated Oct. 2019 from corresponding International Patent Application No. PCT/EP2019/078630.
(Continued)

*Primary Examiner* — Binh Q Tran

(57) ABSTRACT

A method for exhaust gas aftertreatment in a gasoline engine and an exhaust gas aftertreatment system are provided. In the method, two catalytic converters arranged in the exhaust gas tract of the gasoline engine are operated in different states. A first three-way catalytic converter is operated in a slightly low-oxygen range, and a second three-way catalytic converter is operated in a slightly oxygen-rich range. Secondary air is furthermore blown into the exhaust gas tract between the two three-way catalytic converters. It is thereby possible to reduce the output of emissions of the gasoline engine to a great extent. An exhaust gas aftertreatment system is likewise explained.

11 Claims, 1 Drawing Sheet

(51) Int. Cl.
  *F01N 3/10* (2006.01)
  *F01N 3/32* (2006.01)
(52) U.S. Cl.
  CPC .... *F01N 2270/00* (2013.01); *F01N 2560/021* (2013.01); *F01N 2560/025* (2013.01); *F01N 2560/026* (2013.01)

(56) References Cited

U.S. PATENT DOCUMENTS

| | | | | |
|---|---|---|---|---|
| 5,551,231 | A * | 9/1996 | Tanaka | F01N 3/0842 60/289 |
| 6,122,910 | A * | 9/2000 | Hoshi | F01N 3/22 60/297 |
| 9,995,195 | B2 * | 6/2018 | Roy | F01N 13/009 |
| 10,907,519 | B2 * | 2/2021 | Paukner | F01N 3/025 |
| 2005/0120706 | A1 * | 6/2005 | Yoshioka | F01N 13/0093 60/277 |
| 2011/0214417 | A1 * | 9/2011 | Sakurai | F01N 3/0842 60/301 |
| 2017/0226917 | A1 | 8/2017 | Adam et al. | |
| 2017/0370264 | A1 | 12/2017 | Meier et al. | |

FOREIGN PATENT DOCUMENTS

| | | |
|---|---|---|
| DE | 10026359 A1 | 12/2001 |
| DE | 102016202799 A1 | 8/2017 |
| DE | 102017205325 A1 | 10/2018 |
| DE | 102017115399 A1 | 1/2019 |
| EP | 1143131 A2 | 10/2001 |
| EP | 2821609 A1 | 1/2015 |

OTHER PUBLICATIONS

German Office Action dated Sep. 27, 2019 for corresponding German Patent Application No. 10 2018 218 138.1.
Chinese Office Action dated Feb. 22, 2022 for corresponding Chinese patent application No. 201980070350.6.

* cited by examiner

METHOD FOR EXHAUST GAS AFTERTREATMENT, AND EXHAUST GAS AFTERTREATMENT SYSTEM

CROSS-REFERENCE TO RELATED APPLICATIONS

This application claims the benefit of International Application PCT/EP2019/078630 filed Oct. 22, 2019, which claims priority to German Application DE 10 2018 218 138.1, filed Oct. 23, 2018. The disclosures of the above applications are incorporated herein by reference.

TECHNICAL FIELD

The disclosure relates to a method for exhaust gas aftertreatment in a gasoline engine, and to an exhaust gas aftertreatment system.

BACKGROUND

In the case of gasoline engines, three-way catalytic converters are used for exhaust gas aftertreatment. These catalytic converters convert the pollutants, namely hydrocarbons (HC), carbon monoxide (CO) and nitrogen oxides (NOx), into harmless exhaust gas constituents such as water and carbon dioxide. For ideal conversion, it is necessary for certain states to prevail in the catalytic converter. Thus, the temperature of the catalytic converter must be above the light off temperature required for conversion. Moreover, the reactants must be available in the correct ratios. This is the case if the amount of oxygen in the exhaust gas is precisely sufficient to enable all the exhaust gas components to be oxidized. In this case, reference is made to an exhaust gas lambda value of $\lambda=1.0$.

In order to ensure these ideal conversion conditions in the catalytic converter, spark ignition engines are currently controlled in such a way with the aid of lambda probes that the engine delivers exhaust gas with the correct lambda values. Currently, two lambda probes are used for this purpose.

1. A linear lambda probe ahead of a three-way catalytic converter, and
2. A binary lambda probe after the three-way catalytic converter.

This is referred to as a LIN/BIN lambda probe system.

The aim of control is to supply the catalytic converter alternately with slightly rich exhaust gas ($\lambda<1$) and then with slightly lean exhaust gas ($\lambda>1$), giving an average of precisely $\lambda=1.000$. It is helpful here that the catalytic converter has the capacity to store oxygen and also carbon monoxide, thereby ensuring that there is always sufficient reactant available.

a. In the lean phases, HC and CO are oxidized with an excess of oxygen, and the nitrogen oxides are reduced by the stored CO, and excess oxygen is stored in the catalytic converter.

b. In the rich phases, NOx is reduced by CO with a deficiency of oxygen, HC and CO are oxidized by the stored oxygen, and excess CO is stored in the catalytic converter.

For this purpose, the linear lambda probe is used to set the alternating lambda setpoint. The binary lambda probe is used to set a binary probe voltage of 650 mV by way of a "trim control" system.

The overall system only works if the catalytic converter is always successfully held at the average of $\lambda=1.000$. If lean or rich exhaust gas comes from the engine for too long, with the result that the storage capacity is no longer sufficient, there is a breakthrough. In the case of a lean breakthrough, NOx emissions are the result. In the case of a rich breakthrough, there are HC and CO emissions. To avoid this, increasingly large catalytic converters or catalytic converters with a higher storage capacity (higher charge of noble metals) or additional catalytic converters in the underfloor of the vehicles are used for ultra-low emission concepts designed to comply with the most recent exhaust gas legislation.

However, there are repeated deviations in the lambda value from the setpoint due to the very dynamic operation and large number of manipulated variables of a modern internal combustion engine (variable valve timing/valve lift). For this reason, there is no guarantee that the rich and lean phases that are preset in advance will cancel each other out on average. In principle, the trim control system should balance out unequal rich and lean phases. However, this controller is very slow. If a number of relatively large deviations in the lambda value occur in succession, breakthroughs may therefore occur.

The basic problem of the LIN/BIN system is that the catalytic converter is operated in a very narrow conversion window. As a result, even small deviations in one or the other direction lead to emissions.

SUMMARY

The present disclosure provides a method for exhaust gas aftertreatment by way of which emissions may be reduced to a great extent.

The disclosure provides a method for exhaust gas aftertreatment in a gasoline engine. The method includes the following steps: operating a first three-way catalytic converter arranged in the exhaust gas tract of the engine in a slightly low-oxygen range; operating a second three-way catalytic converter arranged downstream thereof in the exhaust gas tract of the engine in a slightly oxygen-rich range; and blowing secondary air into the exhaust gas tract between the two three-way catalytic converters.

The abovementioned problems are solved by the fact that two catalytic converters are operated in different states. Here, the first three-way catalytic converter (main catalytic converter) is operated in such a way that it can reliably reduce all the nitrogen oxides. For this purpose, it is operated somewhat more in the low-oxygen range.

If the first three-way catalytic converter is operated in this way, there is the problem that 100% conversion of HC and CO is not possible. There is therefore always slight HC and CO slip. In order now to completely convert these components, a second three-way catalytic converter is used. It is important for the conversion of the HC and CO that there is sufficient oxygen. For this purpose, secondary air is blown in between the two catalytic converters.

The second three-way catalytic converter should reliably convert all the residual HC and residual CO. The catalytic converter must therefore be operated in the oxygen-rich range.

In view of the legislation, the present disclosure furthermore provides a robust control concept in order to comply with exhaust emissions limits in a stable manner, even with relatively small catalytic converter volumes. In order to achieve this, an NOx sensor is used as an $NH_3$ sensor in order to implement control of the first three-way catalytic converter in the slightly low-oxygen range (slightly rich range).

Operation of the catalytic converter in the low-oxygen range is the case if a binary post-cat probe indicates a probe voltage of 800 mV, for example. However, control with a binary post-cat probe comes up against its limits here since the probe signal is already very flat in the region of 800 mV, making it virtually impossible to control to this setpoint.

According to the disclosure, use is made for this purpose of an NOx sensor which has strong cross sensitivity for ammonia ($NH_3$). If the first three-way catalytic converter is operated in the region of 800 mV post-cat probe voltage, this is the range in which ammonia is produced. According to the disclosure, this can be used to carry out two-point control of the first three-way catalytic converter by the NOx sensor.

This can be performed in the way described below, for example:
1. The engine is operated in a lean way (e.g. $\lambda=1.02$) until the binary probe voltage has reached 650 mV.
2. The engine is then operated in a rich way (e.g. $\lambda=0.98$) until an $NH_3$ rise has been detected by the NOx sensor.

According to the disclosure, an NOx sensor is thus used for purposes of controlling the first three-way catalytic converter. Since an NOx sensor of this kind actually consists of three sensors, namely a binary lambda probe, a linear lambda probe and the actual NOx sensor, then, according to the disclosure, there is no need to use two sensors to perform the control described. It is possible here simply to use the binary probe signal of the NOx sensor.

As regards the second three-way catalytic converter, a binary lambda probe is used to implement control of the second three-way catalytic converter in the slightly oxygen-rich range. This control is required in order likewise to operate the second three-way catalytic converter alternately in a lean and a rich mode and to keep it very close on average to $\lambda=1$.

In this case, the binary lambda probe used to control the second three-way catalytic converter should indicate a probe voltage of less than 400 mV (slightly oxygen-rich range). In order to control the oxygen loading of the second three-way catalytic converter in such a way, use is made according to the disclosure of a binary probe which is controlled to a lean binary probe setpoint (e.g. 300 mV).

Since the exhaust gas is only slightly rich after the first three-way catalytic converter, it is also necessary to add only a very small amount of secondary air. The system therefore requires precise metering of the secondary air. Thus, the secondary air is switched on and off alternately in order to implement the lean and rich phases, where the duration of the on times or secondary air quantities is/are controlled by the probe voltage of the binary probe.

In respect of the control performed according to the disclosure, three steps are thus of essential significance:

The use of the NOx sensor as an $NH_3$ sensor in order to implement control of the first three-way catalytic converter in the slightly rich range, the use of secondary air in order to operate the catalytic converters in different lambda ranges, and the control of the secondary air by the binary probe used in order to operate the second three-way catalytic converter in the slightly lean range.

Overall, a series of advantages is achieved with the method according to the disclosure. These include more stable control of the exhaust gas aftertreatment system and thus lower emissions in the corresponding driving cycles (also RDE driving cycles), a possible reduction in the charge of noble metals in the catalytic converters, and more simple diagnosis of the main catalytic converter by the NOx sensor.

The present disclosure furthermore relates to an exhaust gas aftertreatment system for a gasoline engine, having a first three-way catalytic converter arranged in the exhaust gas tract, a second three-way catalytic converter arranged downstream thereof in the exhaust gas tract, and a device for blowing secondary air into the exhaust gas tract between the two three-way catalytic converters.

A method carried out by an exhaust gas aftertreatment system of this kind has been explained above. A method for controlling an exhaust gas aftertreatment system of this kind is furthermore described. For these control purposes, the system preferably has an NOx sensor used as an $NH_3$ sensor in order to control the first three-way catalytic converter in the slightly low-oxygen range. For this purpose, it is expedient to arrange the NOx sensor in the first three-way catalytic converter.

For controlling the second three-way catalytic converter in the slightly oxygen-rich range, the system has a binary lambda probe.

In principle, it is worthwhile to have active catalytic converter volume available both after the NOx sensor and after the binary probe. As regards the NOx sensor, the reason is that it takes a certain time for a switchover from rich to lean to be carried out. Thus, if the NOx sensor detects a rise in $NH_3$, there should not be an immediate $NH_3$ breakthrough, for which reason the sensor is not arranged after the catalytic converter but in the catalytic converter itself (e.g. at $2/3$ of the length) or between two bricks of the main catalytic converter.

As regards the binary probe, the reason is diagnosis of the catalytic converter or of the probe itself. In order to test the oxygen storage capacity of the second catalytic converter, the system must be operated in the rich or lean mode until a breakthrough occurs. If there were now no further catalytic converter volume available, there would be increased emissions during diagnosis.

It is expedient if the system has a linear lambda probe upstream of the first three-way catalytic converter.

To enable the binary probe provided to control the secondary air supply, the device for blowing in secondary air has a secondary air pump and a secondary air valve.

The second three-way catalytic converter provided can be designed as an underfloor catalytic converter.

It is also possible for the second three-way catalytic converter to be designed as a four-way catalytic converter. This catalytic converter can namely be a pure three-way catalytic converter or, alternatively, a particle filter with a three-way catalyst coating (four-way catalytic converter).

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
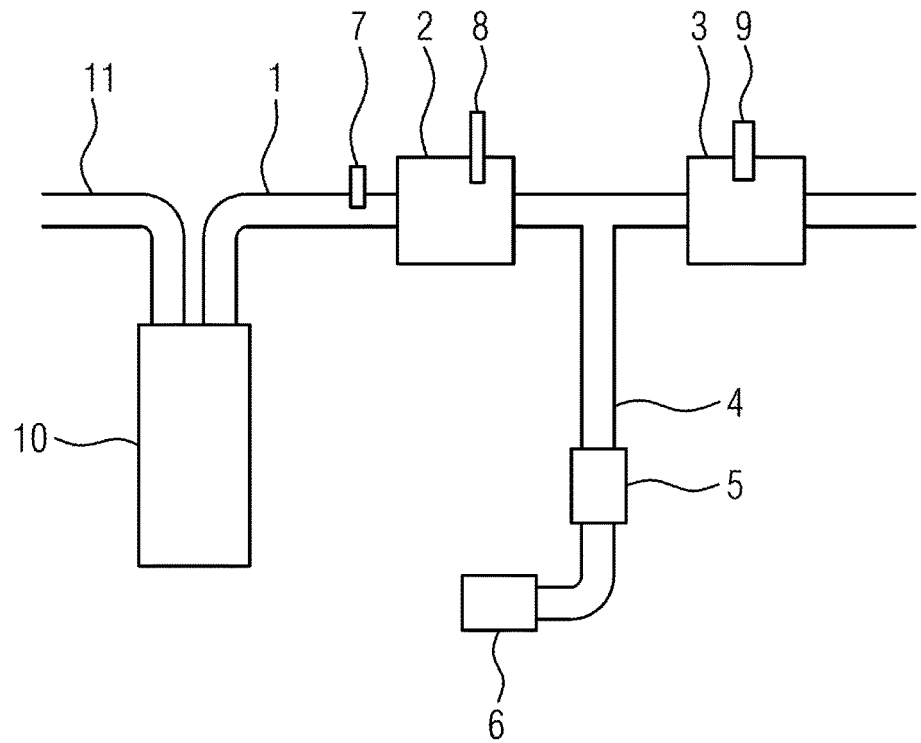
FIG. 1 shows a schematic illustration of an exhaust gas aftertreatment system.

FIG. 1 shows schematically a gasoline engine (spark-ignition engine) 10, which has an air supply tract 11 and an exhaust gas tract 1. Arranged in the exhaust gas tract 1 is a first three-way catalytic converter 2, which is followed by a second three-way catalytic converter 3. A linear lambda probe 7 is arranged upstream of the first three-way catalytic converter 2. The first three-way catalytic converter 2 is provided with an NOx sensor 8, which is arranged in the catalytic converter at ⅔ of the length of the latter.

The second three-way catalytic converter 3 is situated downstream of the first three-way catalytic converter 2 and has a binary lambda probe 9. Opening into the exhaust gas tract 1 between the two catalytic converters 2, 3 is a secondary air line 4, by way of which secondary air is blown in by a secondary air pump 6 and a secondary air valve 5.

Figure 2:
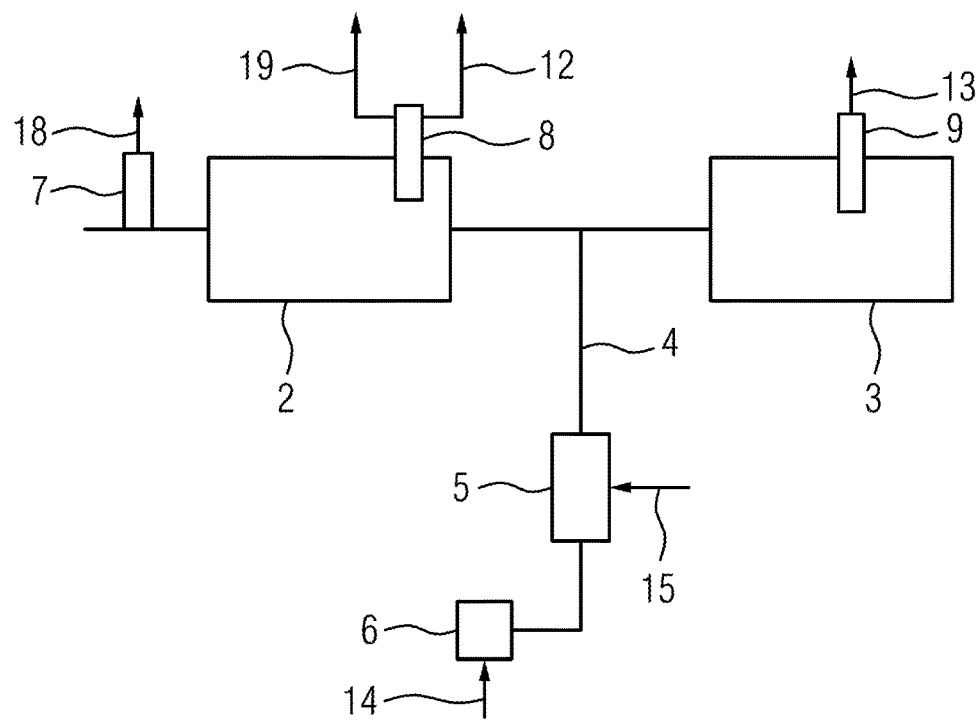
FIG. 2 shows an enlarged illustration of the system in FIG. 1.

The mode of operation of the exhaust gas aftertreatment system described above is explained with reference to FIG. 2. The system has a conventional linear lambda probe 7, which, in a known manner via a line 18, outputs signals to a control unit (not shown), which controls the air-fuel mixture supplied to the engine 10. The first three-way catalytic converter 2 (main catalytic converter) is now operated in such a way that it can reliably reduce all the nitrogen oxides. For this purpose, it is operated in the low-oxygen range. Here, the NOx sensor 8 is used as a sensor for control, on the one hand detecting the proportion of ammonia ($NH_3$) produced in the catalytic converter and on the other hand supplying a binary probe signal for the acquisition of a corresponding probe voltage of a comparable binary post-cat probe. Both signals are supplied via lines 19 and 12 to the control unit in order to perform the corresponding control.

As with the first catalytic converter 2, the second catalytic converter 3 must also be operated alternately in a lean and a rich mode, for which purpose control is likewise necessary in order to keep the second catalytic converter 3 very close to $\lambda=1$ on average. In order to control the oxygen loading of the second catalytic converter 3 in a corresponding manner, use is made of a binary probe 9 by way of which a lean binary probe setpoint is set. For this purpose, corresponding signals 13 are output to the control unit.

Since the exhaust gas is only slightly rich after the first catalytic converter 2, it is also necessary to add only a very small amount of secondary air. The system therefore requires very precise metering of the secondary air. Thus, the secondary air is switched on and off alternately by the secondary air valve 5 in order to implement the lean and rich phases. The duration of the on times or the secondary air quantities is/are controlled by the probe voltage of the binary probe 9. Here, the corresponding actuation of the secondary air pump 6 and of the secondary air valve 5 is indicated at 14 and 15.

A number of implementations have been described. Nevertheless, it will be understood that various modifications may be made without departing from the spirit and scope of the disclosure. Accordingly, other implementations are within the scope of the following claims.

What is claimed is:

1. A method for exhaust gas aftertreatment in a gasoline engine, the method including:
   operating a first three-way catalytic converter arranged in an exhaust gas tract of the gasoline engine in a slightly low-oxygen range;
   operating an NOx sensor arranged in the first three-way catalytic converter;
   operating a second three-way catalytic converter arranged downstream thereof in the exhaust gas tract of the gasoline engine in a slightly oxygen-rich range; and
   blowing secondary air into the exhaust gas tract between the first and second three-way catalytic converters;
   wherein the NOx sensor is used as an NH3 sensor in order to implement control of the first three-way catalytic converter in the slightly low-oxygen range (slightly rich range).

2. The method as claimed in claim 1, wherein a binary lambda probe is used to implement control of the second three-way catalytic converter in the slightly oxygen-rich range (slightly low range).

3. The method as claimed in claim 1, wherein two-point control of the first three-way catalytic converter is carried out by the NOx sensor.

4. The method as claimed in claim 1, wherein a linear lambda probe upstream of the first three-way catalytic converter is used.

5. The method as claimed in claim 1, wherein a secondary air supply is switched on and off alternately for control purposes.

6. An exhaust gas aftertreatment system for a gasoline engine, the exhaust gas aftertreatment system comprising:
   an exhaust gas tract;
   a first three-way catalytic converter arranged in the exhaust gas tract;
   an NOx sensor arranged in the first three-way catalytic converter;
   a second three-way catalytic converter arranged downstream thereof in the exhaust gas tract; and
   a device for blowing secondary air into the exhaust gas tract between the first and second three-way catalytic converters;
   wherein the NOx sensor is used as an $NH_3$ sensor in order to implement control of the first three-way catalytic converter in the slightly low-oxygen range (slightly rich range).

7. The exhaust gas aftertreatment system as claimed in claim 6, further comprising a binary lambda probe for control of the second three-way catalytic converter in the slightly oxygen-rich range.

8. The exhaust gas aftertreatment system as claimed in claim 6, further comprising a linear lambda probe upstream of the first three-way catalytic converter.

9. The exhaust gas aftertreatment system as claimed in claim 6, wherein the device for blowing in secondary air includes a secondary air pump and a secondary air valve.

10. The exhaust gas aftertreatment system as claimed in claim 6, wherein the second three-way catalytic converter is designed as an underfloor catalytic converter.

11. The exhaust gas aftertreatment system as claimed in claim 6, wherein the second three-way catalytic converter is designed as a four-way catalytic converter.

* * * * *